June 24, 1930.  E. V. ANDERSON  1,767,039
STAND PIPE VALVE
Filed Feb. 10, 1927
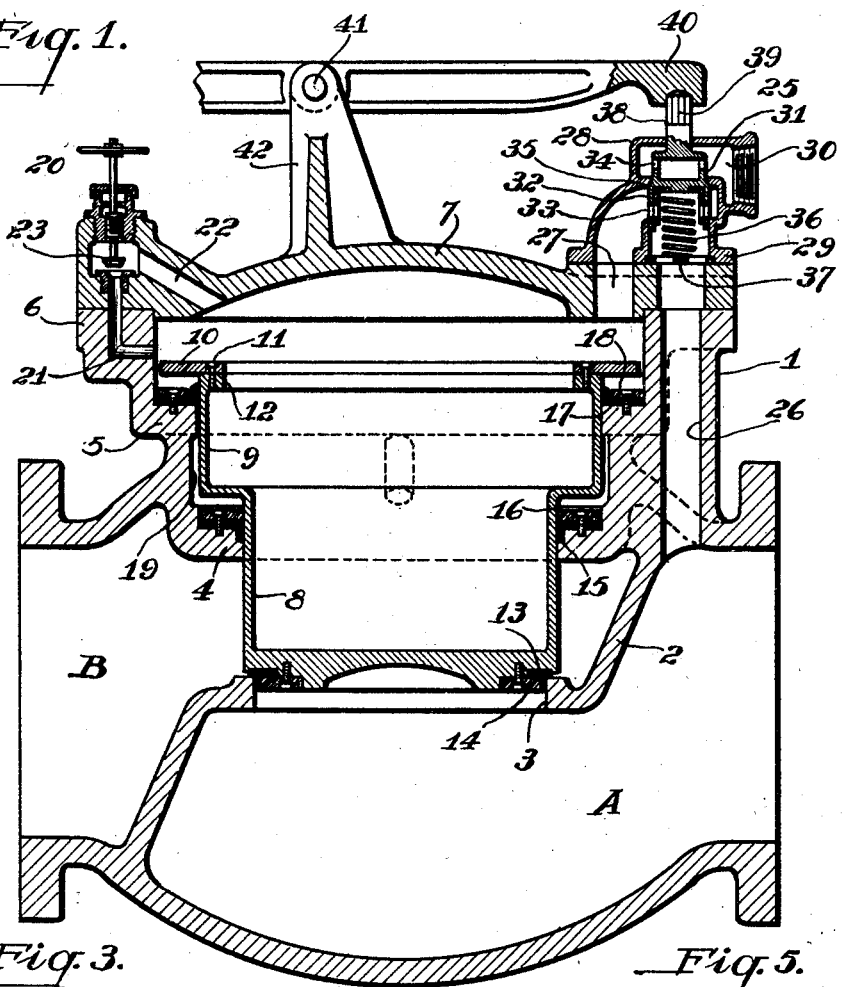
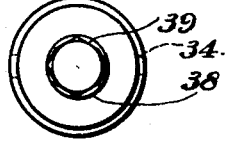
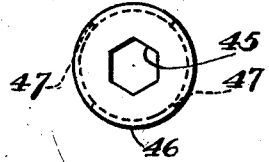
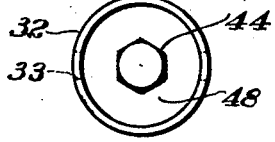
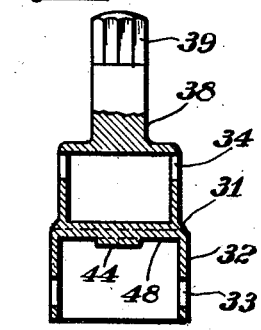
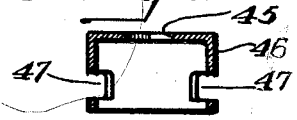
WITNESSES
INVENTOR Patented June 24, 1930

1,767,039

UNITED STATES PATENT OFFICE

EDWARD V. ANDERSON, OF BELLE VERNON, PENNSYLVANIA, ASSIGNOR OF ONE-HALF TO CHARLES E. GOLDEN, OF CRAFTON, PENNSYLVANIA

STANDPIPE VALVE

Application filed February 10, 1927. Serial No. 167,190.

This invention relates to valve mechanism, more particularly to improvements in valves for stand pipes and the like.

It is among the objects of this invention to provide an improved valve mechanism for stand pipes which shall be adequately cushioned in opening and closing to prevent any water hammer or shock in its operation.

Another object of the invention is to provide a valve mechanism of simple and durable mechanical construction in which the passage closing valve shall be of the form of a piston having a constricted portion for controlling the passage and having an enlarged body portion formed integrally therewith to provide a greater piston area.

Still another object of the invention is to provide valve mechanism of the above designated character which shall embody an operating valve of novel construction for controlling the main passage controlling valve and which shall in addition be provided with a regulating valve for controlling or regulating the speed of the passage controlling valve.

Another object of the invention is to provide a valve mechanism of the class described wherein all of the operating parts may be readily inspected and removed by removing the cover of the main valve casing.

In the accompanying drawings constituting a part hereof and in which like reference characters designate like parts, Fig. 1 is a cross sectional view partially in elevation of a valve mechanism embodying the principles of this invention; Fig. 2 a vertical sectional view partially in elevation of a portion of an operating valve; Figs. 3 and 4 top and bottom plan views, respectively, of the valve member shown in Fig. 2; and Figs. 5 and 6 are respectively a top plan view and a vertical sectional view of a port ring adapted to cooperate with the valve members shown in Fig. 2.

Referring to Fig. 1 of the drawings the structure therein illustrated comprises a valve casing or body portion 1 provided with a rigid diaphragm 2 having a port or opening 3 therein, the diaphragm 2 dividing the valve chamber into an inlet chamber designated A and an outlet chamber designated B.

The valve casing 1 is provided with shoulders 4 and 5 and a flanged portion 6, each of which encloses a bore axially aligned with port 3, and each of which bores is larger than the preceding one in order away from the port. A cover member 7 is mounted on the flange 6 and secured thereto in any suitable manner as by a plurality of bolts (not shown).

Disposed within the valve chamber is a piston valve 8 having an enlarged portion 9 formed integrally therewith which is disposed in the enlarged portion of the casing above the shoulder 4 thereof. A cylindrical ring 10 is secured by screws or bolts 11 to a radial flanged portion 12 of the valve 8 to constitute a radial flange. The valve 8 at its bottom portion is provided with a piston ring 13 which is secured thereto by a follower 14, the ring 13 constituting the seating portion of the valve which engages that portion of the diaphragm 2 which comprises the valve seat. A liner cup 15 is secured to the shoulder portion 4 of the valve by a follower 16 and a piston cup 17 is similarly fastened by a follower 18 to the shoulder 5. The cups 15 and 17 engage the piston valve in the manner shown to seal off the annular chamber 19 provided between the shoulder portions 4 and 5. The cups 15 and 17 maintain proper alignment of the valve 8 and are the only liners employed in this construction.

A regulating valve generally designated at 20 is provided on the valve cover 7 and passages 21 and 22 are provided in the valve casing 1 and the cover 7, respectively, to establish communication between the upper valve chamber and the annular space below the ring 10 when the valve is in its open position. The passages 21 and 22 are controlled by a valve 23 for a purpose to be hereinafter explained.

An operating valve generally designated at 25 controls passages 26 and 27 provided in the valve casing and cover member 1 and 7, respectively. The valve 25 comprises an integral body 28 having a flanged bottom 29 adapted to seat on a correspondingly shaped portion of the cover member 7, openings therein registering with passages 26 and 27 of the casing and cover, respectively, and being further provided with a passage 30. The valve member 31 is disposed in the valve body 28 and is adapted for vertical movement therein in a manner hereinafter explained. Valve 31 is provided with a depending skirt portion 32 having ports 33 therein and is further provided with ports 34. The valve is adapted to engage the seat 35 of the body 28 and is yieldingly urged against its seat by a coil spring 36 supported by a spider 37 held in screw thread engagement with the face of the valve body 28. The valve member 31 is provided with a stem portion 38 having an octagonal shaped head 39 which fits into a similarly shaped recess of a lever 40. The lever 40 is fulcrumed at 41 to a projecting lug 42 that is formed integrally with the cover 7. The free end of the lever 40 is connected to any suitable mechanical linkage adapted to actuate the lever about its fulcrum or pivotal support 41 to effect a downward movement of the valve 31 against the action of the spring 36.

Referring to Figs. 2 to 6, inclusive of the drawings, the valve member 31 is provided with a central lug 44 of hexagonal shape as shown in Fig. 4 which is adapted to engage a correspondingly shaped opening 45 provided in a port ring 46, Figs. 5 and 6. The port ring is provided with ports 47 that cooperate with the ports 33 of the valve member 31 and the port ring 46 may be adjusted by means of its engagement with the hexagonal lug 44 of the member 31 to regulate the delivery pressure of the ports 33. The port ring 46 is normally biased by the spring 36 to rest against the bottom face 48 of the member 31 as shown in Fig. 1.

The operation of the valve mechanism is briefly as follows: The main passage controlling valve 8 is normally seated or closed as shown in Fig. 1 and is so held by the initial pressure at A passing through the passage 26 and thence through the port 33 of the operating valve and the passage 27 to the valve chamber. The combined area of the ring member 10 the shoulder portion of the piston and bottom portion of the piston valve 8 is greater than the total area underneath the valve and the ring 10 so that the force acting to keep the valve 8 on its seat is greater than that of the initial pressure acting underneath the valve member and the valve is therefore normally closed.

To open the passage valve 8 the lever 40 is actuated by pressing it down on the stem 38 of the valve member 31 against the action of the spring 36 to close the port 33 and establish communication of the passage 27 with the outlet 30 through the port 34 of the operating valve. When this connection is effected and the initial pressure cut off from the passage 26 the fluid in the valve chamber is exhausted through the passage 27 and the port 34 to the drainage outlet 30. The initial pressure underneath the piston valve 8 will lift the valve from its seat and open the passage through the port 3 of the fixed diaphragm 2.

The speed at which the piston valve 8 opens and closes is regulated by the valve 20 and the delivery pressure of the port 33 of the valve 31, these being adjustable as previously explained.

The water in the valve chamber above the piston valve 8 acts as a cushion against the initial pressure acting underneath the valve 8 to the extent that its flow is restricted by the valve 20 and the valve 31. Similarly when the lever 40 is released and communication is again established between the passages 27 and 26 through the port 33 to close the piston valve 8, the fluid in the annular chamber underneath the ring 10 will flow out through the passage 21 as restricted by the valve 23 to retard the passage closing valve 8 in its downward movement. When the flange 10 begins to cut off the passage 21 the fluid underneath the flange can only escape by leakage around the flange thus establishing a cushion to prevent any water hammer or shock in the closing of the main passage valve.

The operation and functioning of the valve mechanism is such that the valve 8 is normally closed by the initial pressure and opened by manipulation of the lever 40, which controls the operating valve 31 that cuts off the initial pressure from the valve chamber. When the force acting on the valve 31 through the lever 40 is released the spring 36 returns the valve 31 to its normal position. Communication is thus established between the passages 26 and 27 through the ports 33 and 47 of the valve 32 and its cooperating ring 46.

It is evident from the foregoing description of this invention that valves for stand pipes and the like made in accordance therewith embody positive means for controlling the opening and closing operations of the main passage valve and for regulating the speed of the valve in its opening and closing movements. It is also evident that an effective cushion is provided in both the opening and closing operations to prevent water hammer or shock.

Although a specific embodiment of the invention has been herein set forth, it will be obvious to those skilled in the art that various modifications may be made in the details of construction without departing from the principles herein set forth.

By removing cover 7 the entire piston valve including the ring 10 can be lifted out.

This allows ready inspection or removal of any one or all of the packing members without other disassembly. The simplicity of this arrangement for permitting repair and inspection of any part of the structure is an important feature of the invention. Furthermore the double cushioning chambers provided by the ring 10 and its cooperating bore make the valve unusually safe, and gives it long life.

I claim:

1. A valve mechanism comprising a casing having a diaphragm therein with a port in the diaphragm, a piston valve slidably mounted in the casing and adapted to control said port, said piston valve having three cylindrical portions of different diameters, each being larger than the next inner one, bores in the casing for receiving said cylindrical portions of the valve and for forming cushioning chambers therearound, packing members secured to the shoulders formed above the two inner bores, the larger outer bore being closed by a removable cover.

2. A valve comprising a casing divided by a diaphragm having a main port therethrough, a main piston valve reciprocably mounted in the casing and governing the port, said valve comprising a cylindrical seating portion adapted to control the port, a larger cylindrical body portion beyond the seating portion, and a still larger terminal cylindrical flange beyond and carried by the body portion, bores in the casing adapted respectively to receive the seating portion, body portion, and flange, each bore being larger than the other in the order named, shoulders formed in the casing beyond the two last-mentioned bores, whereby to form two cushioning chambers between the valve and casing, and a removable cover member closing the larger bore of the casing.

3. A valve comprising a casing having a diaphragm therethrough with a main port therein; a piston valve adapted to control the port, the casing having three bores axially aligned with the said port and each larger than the other in order away from the port, laterally extending shoulders above the two last-mentioned bores, a piston valve having three axially aligned cylindrical portions adapted to slidably fit respectively into the said bores and to form fluid-cushioning chambers therebetween, and a removable cover cap adapted to close the largest bore.

4. A valve comprising a casing divided by a diaphragm having a main port therethrough, a main piston valve reciprocably mounted in the casing and governing the port, said valve comprising a cylindrical seating portion adapted to control the port, a larger cylindrical body portion beyond the seating portion, and a still larger terminal cylindrical flange beyond and carried by the body portion, bores in the casing respectively adapted to receive the seating portion, body portion, and flange, each bore being larger than the other in the order named, shoulders formed in the casing beyond the two last-mentioned bores, packing members lying upon and removably attached to the said shoulders, and a removable cover member closing the larger bore of the casing.

5. A valve comprising a casing having a diaphragm therethrough with a main port therein, a piston valve adapted to control the port, the casing having three bores axially aligned with the said port and each larger than the other in order away from the port, laterally extending shoulders beyond the two last-mentioned bores, a piston valve having three axially-aligned cylindrical portions adapted to slidably fit respectively into the said bores and to form fluid-cushioning chambers there-between, packing members positioned around the outer portions of the two innermost bores and retained in position by means of removable rings screwed to the said shoulders, and a removable cover cap adapted to close the largest bore.

In testimony whereof, I sign my name.

EDWARD V. ANDERSON.